United States Patent
Hafeez

(10) Patent No.: US 7,558,330 B2
(45) Date of Patent: Jul. 7, 2009

(54) MULTIPLE STREAM CO-PHASING FOR MULTIPLE-INPUT-MULTIPLE-OUTPUT (MIMO) SYSTEMS

(75) Inventor: Abdulrauf Hafeez, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 629 days.

(21) Appl. No.: 11/275,068

(22) Filed: Dec. 7, 2005

(65) Prior Publication Data

US 2007/0127586 A1    Jun. 7, 2007

(51) Int. Cl.
*H04B 7/02* (2006.01)
*H04L 1/02* (2006.01)

(52) U.S. Cl. ...................... 375/267; 375/347
(58) Field of Classification Search ............ 375/267, 375/347
See application file for complete search history.

(56) References Cited

U.S. PATENT DOCUMENTS

| | | | | |
|---|---|---|---|---|
| 4,031,539 A | * | 6/1977 | Woodward | 343/797 |
| 6,680,928 B1 | * | 1/2004 | Dent | 370/342 |
| 2004/0196919 A1 | * | 10/2004 | Mehta et al. | 375/267 |
| 2005/0025271 A1 | * | 2/2005 | Molisch et al. | 375/347 |
| 2007/0140105 A1 | * | 6/2007 | Coon | 370/208 |

OTHER PUBLICATIONS

Gorokhov A. et al. Transmit/receive MIMO antenna subset selection, Acoustics, Speech, and Signal Processing, 2004. Proceedings. (ICASSP '04). IEEE International Conference, on vol. 2 pp. ii-3-16, May 17-21, 2004. see sections 1-3, equation 6; abstract.

* cited by examiner

*Primary Examiner*—David C Payne
*Assistant Examiner*—Nader Bolourchi

(57) ABSTRACT

A system and method for transmitting multiple independent data streams from subsets of a plurality of radio antennas. The method includes determining by the receiver, an antenna partitioning, including relative phase rotations to be applied to each antenna, that results in the highest channel capacity among the possible partitionings. The receiver then provides partitioning information to the transmitter, including the number of antenna subsets, which antennas are included in each subset, the capacity of the data stream to be transmitted from each antenna subset, and the relative phase rotations to be applied to the antennas in each subset. The transmitter partitions the plurality of radio antennas into mutually exclusive subsets in accordance with the partitioning information, applies the relative phase rotation to each antenna, and transmits an independent data stream from each subset of antennas with a rate not greater than the stream capacity.

12 Claims, 5 Drawing Sheets

MULTIPLE STREAM CO-PHASING FOR MULTIPLE-INPUT-MULTIPLE-OUTPUT (MIMO) SYSTEMS

BACKGROUND

The present invention relates to radio communication systems. More particularly, and not by way of limitation, the present invention is directed to an apparatus and method for transmitting independent data streams from a plurality of radio antennas.

The capacity of a wireless channel can be enhanced greatly by utilizing multiple transmit and multiple receive antennas. This has been demonstrated by open-loop multiple-input-multiple-output (MIMO) schemes, such as the Bell Labs Layered Space-Time (BLAST) architecture. Open-loop MIMO schemes do not require any feedback link from the receiver to the transmitter, as in closed-loop MIMO schemes. However, by exploiting instantaneous channel-state information provided to the transmitter by the receiver as in closed-loop MIMO schemes, the channel capacity is further enhanced. Closed-loop MIMO schemes include Eigenmode-BLAST, which is an optimum closed-loop MIMO scheme, and Per Antenna Rate Control (PARC), which achieves the open-loop MIMO capacity. In PARC, an independently coded and modulated data stream is transmitted from each transmit antenna. The coding rate for each data stream is provided by the receiver via a feedback mechanism.

While optimum closed-loop MIMO schemes require a large amount of instantaneous channel information to be fed back from the receiver to the transmitter, PARC requires much less feedback. However, PARC does not perform well in certain conditions, such as low signal-to-noise ratio (SNR) conditions, systems with correlated antennas, systems with fewer receive antennas than transmit antennas, and channels with Ricean fading. In such conditions, the MIMO channel often cannot support the transmission of as many data streams as the number of transmit antennas (as done in PARC). This limits the capacity of PARC. This problem was partly solved by Selective-PARC (S-PARC), which is an extension of PARC. S-PARC transmits as many data streams as can be supported by the channel by using the same number of transmit antennas as there are data streams. S-PARC performs better than PARC in the above-mentioned conditions. However, since S-PARC may not utilize all transmit antennas, its capacity is significantly lower than optimum closed-loop MIMO.

Thus, what is needed in the art is a closed-loop MIMO scheme that overcomes the deficiencies of conventional systems and methods by utilizing all transmit antennas to transmit an adaptive number of data streams. The present invention provides such a system and method.

SUMMARY

The present invention is a system and method for implementing in a radio communication system, a closed-loop MIMO scheme that utilizes, in one embodiment, all transmit antennas to transmit an adaptive number of data streams. This is done by partitioning the set of transmit antennas into mutually exclusive subsets to transmit independent data streams after "co-phasing". The term "co-phasing" refers to a procedure in which relative phase rotations are applied to a data stream transmitted from multiple antennas. The concept of co-phasing is similar to beamforming, except that co-phasing is performed based on instantaneous channel-state information fed back to the transmitter by the receiver. The relative phase rotations (co-phasing angles) are designed to maximize the received signal power, which approximately maximizes channel capacity. An iterative algorithm may be used for finding the co-phasing angles. The scheme, referred to herein as "Multiple Stream Co-phasing" (MSC), requires similar complexity and feedback as S-PARC. However, MSC significantly outperforms S-PARC and achieves close to the capacity of optimum closed-loop MIMO for many channels of interest.

Thus, in one aspect, the present invention is directed to a method of transmitting multiple independent data streams from subsets of a plurality of radio antennas. The method includes determining by the receiver, a partitioning of the plurality of radio antennas that provides the highest channel capacity among all possible partitionings, and providing information regarding the determined partitioning to the transmitter. The transmitter partitions the plurality of radio antennas into mutually exclusive subsets in accordance with the determined partitioning information, applies a relative phase rotation to each antenna, and transmits an independent data stream from each partitioned subset of antennas.

In another aspect, the present invention is directed to a method of transmitting a data stream from a selected subset of a plurality of radio antennas. The method includes partitioning by the receiver, the plurality of radio antennas into a plurality of subsets; and calculating by the receiver for each subset, a relative phase rotation to be applied to each antenna in the subset, and a stream capacity for the subset with the relative phase rotations applied. The receiver then selects a subset having the highest stream capacity and sends information to the transmitter regarding the selected subset. The transmitter then transmits the data stream from the selected subset of antennas after applying the relative phase rotations to the antennas in the selected subset.

In yet another aspect, the present invention is directed to a radio system for transmitting multiple independent data streams from subsets of a plurality of radio antennas. A receiver includes means for determining a partitioning of the plurality of radio antennas that provides the highest channel capacity among all possible partitionings, and means for sending information regarding the determined antenna partitioning to a transmitter. The transmitter includes means for partitioning the plurality of radio antennas into mutually exclusive subsets in accordance with the determined partitioning information; means for applying a relative phase rotation to each antenna; and means for transmitting an independent data stream from each partitioned subset of antennas.

In still yet another aspect, the present invention is directed to a radio system for transmitting a data stream from a selected subset of a plurality of radio antennas. The system includes a receiver having means for partitioning the plurality of radio antennas into a plurality of subsets; and means for calculating for each subset, a relative phase rotation to be applied to each antenna in the subset, and a stream capacity for the subset with the relative phase rotations applied. The receiver also selects a subset having the highest stream capacity, and sends information to the transmitter regarding the selected subset. The system also includes a transmitter comprising means for transmitting the data stream from the selected subset of antennas after applying the co-phasing angles to the antennas in the selected subset.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1:
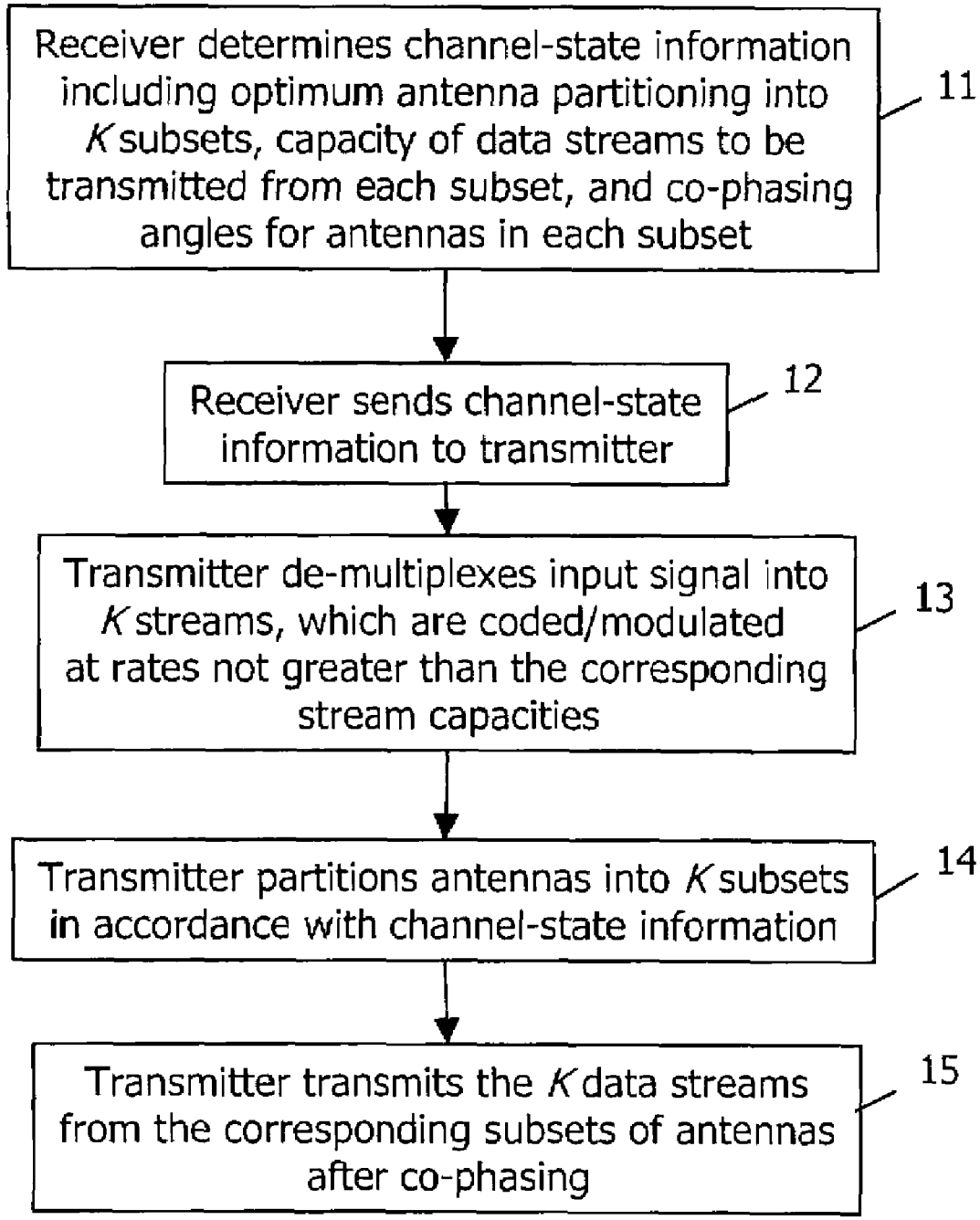
FIG. 1 is a flowchart illustrating the steps of an exemplary overall multi-stream co-phasing process performed by a transmitter and receiver in accordance with the teachings of the present invention.

FIG. 1 is a flowchart illustrating the steps of an exemplary overall multi-stream co-phasing process performed by a transmitter and receiver in accordance with the teachings of the present invention. At step 11, the receiver determines channel-state information in a process shown in more detail in FIG. 2. In a preferred embodiment, the channel-state information includes an optimum antenna partitioning into K subsets, co-phasing angles for each antenna, and stream capacity (i.e., rate) information for the optimum antenna partitioning. At step 12, the receiver sends the channel-state information to the transmitter. At step 13, the transmitter de-multiplexes an input signal into K independent streams based on the antenna-partitioning information received from the receiver. Each stream may be coded and modulated at a rate which is not greater than the stream capacity. Each stream may also be scaled. At step 14, the transmitter partitions the antennas into K subsets and applies the co-phasing angles to each antenna in accordance with the channel-state information. At step 15, the transmitter transmits the K data streams from the K subsets of antennas.

Thus, based on instantaneous channel-state information received over a feedback channel from the receiver, the transmitter divides an input data signal into K separate streams and sends parallel sequences of data symbols (streams) to multiple antennas. Different phase rotations applied to each antenna eliminate mutual interference. By transmitting K streams in parallel, the transmission time required to send K symbols is reduced to one channel use. The total transmission rate is the sum of all of the separate stream rates.

Figure 2:
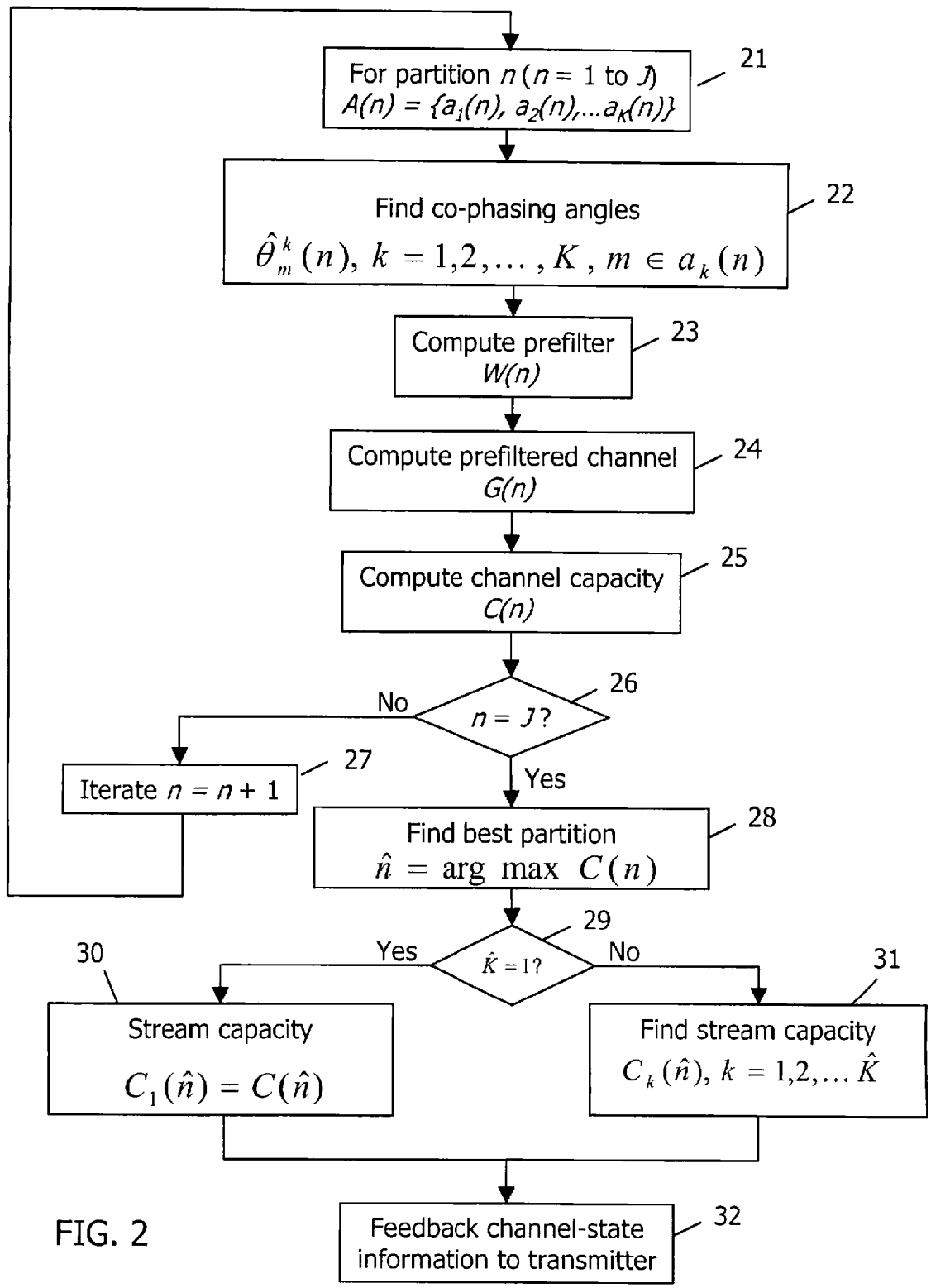
FIG. 2 is a flowchart illustrating the steps of an exemplary process for computing channel-state feedback information by the receiver in accordance with the teachings of the present invention.

FIG. 2 is a flowchart illustrating the steps of an exemplary process for computing channel-state feedback information by the receiver in accordance with the teachings of the present invention. The receiver analyzes each possible partition and determines a partition that provides the highest channel capacity (i.e., total transmission rate) among all possible partitionings. If the transmitter does not support all possible partitions, the receiver may analyze only those partitions that are supported by the transmitter. Each partition identifies the number of antenna subsets, which antennas are in each subset, the capacity of the data stream to be transmitted from each antenna subset, and what co-phasing angles are to be applied to the antennas in each subset.

The process begins at step 21 with the first partition n out of J partitions to be analyzed. Given the number of transmit and receive antennas, the receiver determines all possible (or desirable) transmit antenna set partitions. The receiver also knows (or estimates) the channel response matrix H and the noise variance $N_0$. At step 22, the co-phasing angles $\theta_m^k(n)$ are determined using equation (9) and an iterative technique described below. At step 23, a prefilter weight matrix W(n) is computed using equation (4). At step 24, a prefiltered channel G(n) is computed as the product of W(n) and a channel impulse response matrix H using equation (5). At step 25, the channel capacity C(n) for the first partition is evaluated using equation (6). At step 26, the process determines whether all J partitions have been analyzed. If not, the process iterates n=n+1 at step 27, and returns to step 21 to analyze the next possible partition. If all of the J partitions have been analyzed, the process moves to step 28, where the receiver selects the partition that maximizes capacity (e.g., $\hat{n}$). At step 29, it is determined whether $\hat{K}$ is equal to one, where $\hat{K}$ is the number of input streams corresponding to the selected partition. If $\hat{K}=1$, the process moves to step 30 and determines the stream capacity. If $\hat{K}>1$, the method moves to step 31 where the stream capacity for each input stream $k=1, 2, \ldots, \hat{K}$ is obtained using equation (12). At step 32, the receiver sends predefined channel-state information to the transmitter.

Figure 3:
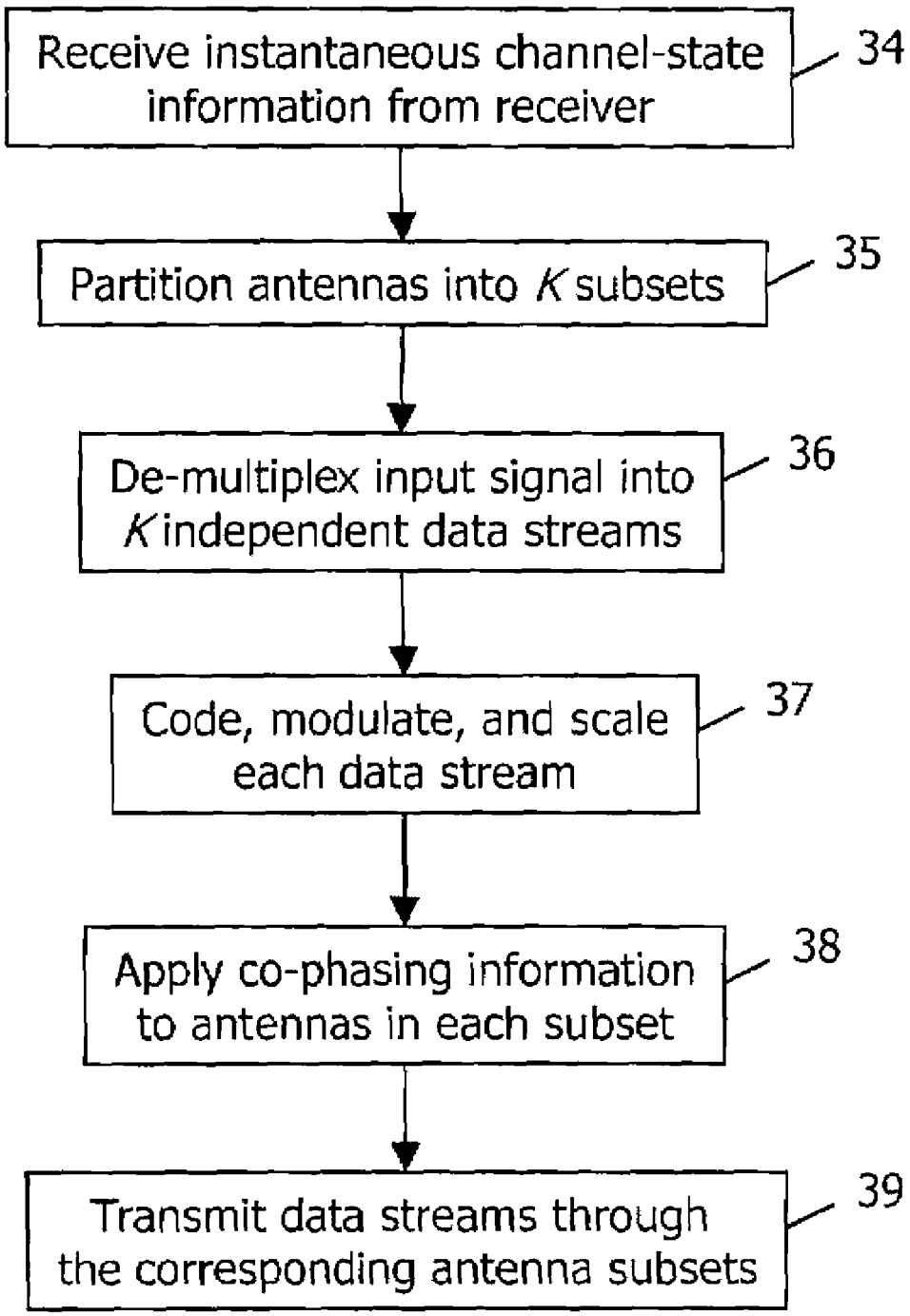
FIG. 3 is a flowchart illustrating the steps of an exemplary process for utilizing channel-state feedback information by the transmitter to maximize transmission capacity in accordance with the teachings of the present invention.

FIG. 3 is a flowchart illustrating the steps of an exemplary process for utilizing channel-state feedback information by the transmitter to maximize transmission capacity in accordance with the teachings of the present invention. At step 34, the transmitter receives the instantaneous channel-state information from the receiver. In one embodiment, the channel-state information includes an optimum antenna partitioning into K subsets, co-phasing angles for each antenna, and stream capacity (i.e., rate) information for the optimum antenna partitioning. At step 35, the transmitter partitions the transmit antennas into K subsets as indicated by the channel-state information. At step 36, an input signal is de-multiplexed into K independent data streams, which are optionally coded, modulated, and scaled at step 37. At step 38, the transmitter applies the co-phasing information to the antennas in each subset, and at step 39, transmits independent data streams in parallel through each antenna subset. The following sections describe in more detail, the processes performed in both the receiver and the transmitter.

Consider a communication system with M transmit antennas and N receive antennas (i.e., an M×N MIMO system). Suppose that the channel is quasi-static and flat fading. The baseband system model can be written as:

$$\underline{y} = H\underline{x} + \underline{w} \quad (1)$$

where $[x_1, x_2, \ldots, x_M]^T$ is the transmitted signal, $[y_1, y_2, \ldots, y_N]^T$ is the received signal, $H=\{h_{i,j}\}$ is the N×M channel impulse response matrix, and $[w_1, w_2, \ldots, w_N]^T$ is a Gaussian noise vector with mean zero and covariance matrix $N_0 I_N$, where $I_N$ denotes an N×N identity matrix. The total average transmit power is $P_T$.

$$E[\underline{x}^H \underline{x}] = P_T \quad (2)$$

The transmitted signal is obtained as:

$$\underline{x} = W\underline{s} \quad (3)$$

where $[s_1, s_2, \ldots, s_K]^T$ is the input signal demultiplexed into $K \leq M$ streams which can be independently coded and modulated and W is an M×K prefilter weight matrix. The following describes a method for determining the prefilter weight matrix. It is assumed that the channel impulse response matrix H and the noise variance $N_0$ are known at the receiver. A person skilled in the art will appreciate that the true values can be replaced by their estimates.

Let $A(n)=\{a_1(n), a_2(n), \ldots, a_K(n)\}$ be the n-th partition of the set of transmit antenna indices $\{1, 2, \ldots, M\}$. The set $a_k(n)$ contains the indices of the antennas used for the transmission of the k-th input stream in the n-th partition. The sets contained in a partition are constrained to be mutually exclusive and have at least one element each. The prefilter weight matrix for the n-th antenna set partition is given by:

$$W(n) = \sqrt{\frac{P_T}{K}} \left[ \frac{1}{\sqrt{|a_1(n)|}} \underline{\phi}_1(n) \quad \frac{1}{\sqrt{|a_2(n)|}} \underline{\phi}_2(n) \quad \ldots \quad \frac{1}{\sqrt{|a_K(n)|}} \underline{\phi}_K(n) \right] \quad (4)$$

where $\underline{\phi}_k(n)$ is an M×1 column vector with $|a_k(n)|$ non-zero elements $e^{j\theta_m^k(n)}$ in rows $m \in a_k(n)$ and zero elements in the remaining rows, where $\theta_m^k(n)$ is the co-phasing angle in radians for the k-th data stream and the m-th transmit antenna (corresponding to the m-th row and the k-th column of the prefilter weight matrix), and $|a|$ refers to the size of the set a.

The prefiltered channel is given by:

$$G(n) = HW(n) = \sqrt{\frac{P_T}{K}} \left[ \frac{1}{\sqrt{|a_1(n)|}} \sum_{m \in a_1(n)} \underline{h}_m e^{j\theta_m^1(n)} \quad \frac{1}{\sqrt{|a_2(n)|}} \sum_{m \in a_2(n)} \underline{h}_m e^{j\theta_m^2(n)} \quad \ldots \quad \frac{1}{\sqrt{|a_K(n)|}} \sum_{m \in a_K(n)} \underline{h}_m e^{j\theta_m^K(n)} \right] \quad (5)$$

The capacity of this scheme is given by:

$$C(n) = \log_2 \det\left(I_N + \frac{1}{N_0} G(n) G^H(n)\right) \quad (6)$$
$$= \log_2 \det\left(I_K + \frac{1}{N_0} G^H(n) G(n)\right)$$

The co-phasing angles $\theta_m^k(n)$ can be found by maximizing channel capacity. It can be seen that at high SNR, this is equivalent to maximizing the determinant of the prefiltered channel autocorrelation matrix $G^H(n)G(n)$. The capacity and the determinant metric are non-linear functions of the angles. Since the determinant of a matrix is closely related to the trace of the matrix, the present invention utilizes the trace of the prefiltered channel autocorrelation matrix, given by:

$$\text{Trace}(G^H(n)G(n)) = \frac{P_T}{K} \sum_{k=1}^{K} \frac{1}{|a_k(n)|} \left\| \sum_{m \in a_k(n)} \underline{h}_m e^{j\theta_m^k(n)} \right\|^2 \quad (7)$$

to find the co-phasing angles. The trace metric, which equals the total received signal power, is also a non-linear function of the angles. However, the trace metric decouples in the input streams, which enables the co-phasing angles to be found independently for each data stream. Based on the trace metric, the co-phasing angles for the k-th stream can be found by using the partial derivatives:

$$\frac{\partial}{\partial \theta_m^k(n)} \left\| \sum_{l \in a_k(n)} \underline{h}_l e^{j\theta_l^k(n)} \right\|^2 = 0 \quad (8)$$

for each $m \in a_k(n)$.

It can be seen that the optimum co-phasing angles $\hat{\theta}_m^k(n)$ satisfy the equations:

$$\hat{\theta}_m^k(n) = \tan^{-1}\left(\frac{\text{Im}\{\gamma_m^k(n)\}}{\text{Re}\{\gamma_m^k(n)\}}\right) \quad (9)$$

where $$\gamma_m^k(n) = \underline{h}_m^H \left( \sum_{\substack{l \in a_k(n) \\ l \neq m}} \underline{h}_l e^{j\theta_l^k(n)} \right). \quad (10)$$

Note that for each data stream, the co-phasing angle for one of the transmit antennas can be arbitrarily set to zero (or another value), i.e. $\hat{\theta}_{m'}^k(n)=0$ for one $m' \in a_k(n)$. Also note that equation (9) is non-linear in the co-phasing angles, except when $|a_k(n)|=2$. In this case, we have $\hat{\theta}_{m'}^k(n)=0$ and $$\hat{\theta}_{m''}^k(n) = \tan^{-1}\left(\frac{\text{Im}\{\underline{h}_{m''}^H \underline{h}_{m'}\}}{\text{Re}\{\underline{h}_{m''}^H \underline{h}_{m'}\}}\right) \quad (11)$$

for $a_k(n)=\{m',m''\}$. An iterative algorithm can be used to determine the co-phasing angles for $|a_k(n)|>2$. Initially, all co-phasing angles may be set to zero (or some other value). In each iteration, the angles are updated using equation (9) in a parallel or serial fashion. In the parallel case, the angles in the current iteration are determined using the angles in the previous iteration only, while in the serial case, the angles in the current iteration are determined using the angles in the previous iteration and the previously-updated angles in the current iteration.

The receiver performs the process shown above in FIG. 2, and if it is determined at step 29 that $\hat{K}>1$, the stream capacity for each input stream $k=1, 2, \ldots, \hat{K}$ is obtained at step 31 as:

$$C_k(\hat{n}) = \log_2\left[1 + \frac{1}{N_0} \underline{g}_k^H(\hat{n})(I_N + G_{k+1}(\hat{n})G_{k+1}^H(\hat{n}))^{-1} \underline{g}_k(\hat{n})\right] \quad (12)$$

where $\underline{g}_k(\hat{n})$ is the k-th column of the matrix $G(\hat{n})$, and $G_k(\hat{n})$ is an $N \times (\hat{K}-k+1)$ matrix given by $G_k(\hat{n})=[\underline{g}_k(\hat{n}), \underline{g}_{k+1}(\hat{n}), \ldots, \underline{g}_{\hat{K}}(\hat{n})]$. The selected partition $\hat{n}$ is signaled to the transmitter along with the $\hat{K}$ rates $\{r_1, r_2, \ldots, r_{\hat{K}}\}$, where $r_k$ is the largest rate in bits per symbol less than or equal to $C_k(\hat{n})$ which is supported by the transmitter, and the $M-\hat{K}$ co-phasing angles $\{\hat{\theta}_m^k(\hat{n}), k=1, 2, \ldots, \hat{K}, m \in a_k(\hat{n})\}$ (that are not arbitrarily set). The amount of feedback required is thus M real coefficients plus a $\log_2 J$ bit integer, where J is the number of possible (or desirable) partitions.

Figure 4:
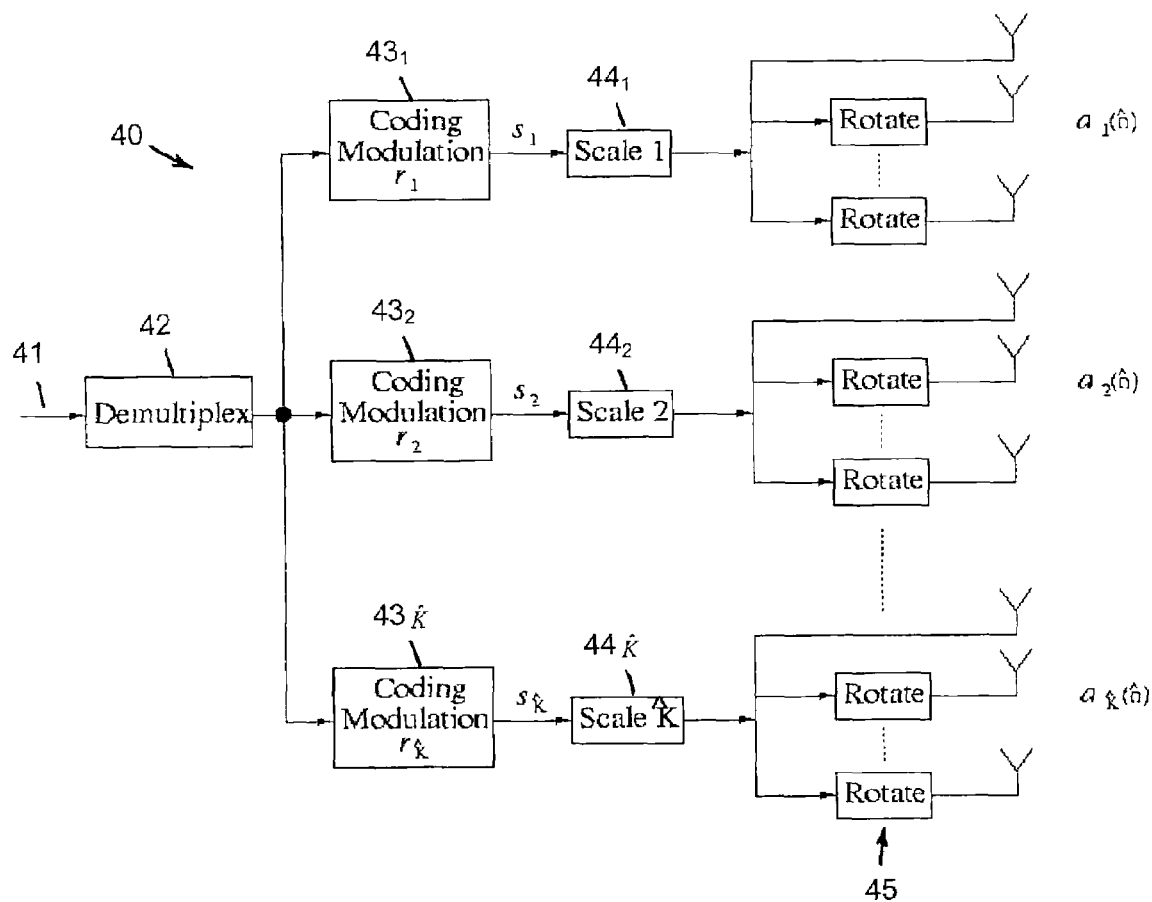
FIG. 4 is a simplified block diagram of an embodiment of the transmitter of the present invention.

FIG. 4 is a simplified block diagram of an embodiment of the transmitter 40 of the present invention. As shown, an input signal 41 is passed to a demultiplexer 42 where it is demultiplexed into $\hat{K}$ signals, which are independently coded and modulated in encoder/modulators 43₁-43_K at rates $\{r_1, r_2, \ldots, r_K\}$ to produce $\hat{K}$ streams $\{s_1, s_2, \ldots, s_K\}$, respectively. The $\hat{K}$ streams are then scaled by scalers 44₁-44_K and independently phase-rotated by phase rotators 45 prior to transmission. The k-th stream is scaled by $\sqrt{P_T/\hat{K}|a_k(\hat{n})|}$ and transmitted using the subset $a_k(\hat{n})$ of the transmit antennas after co-phasing (phase rotation) using the angles $\hat{\theta}_m^k(\hat{n}), m \in a_k(\hat{n})$. The antenna set partition, stream rates, and co-phasing angles are provided by the receiver.

Figure 5:
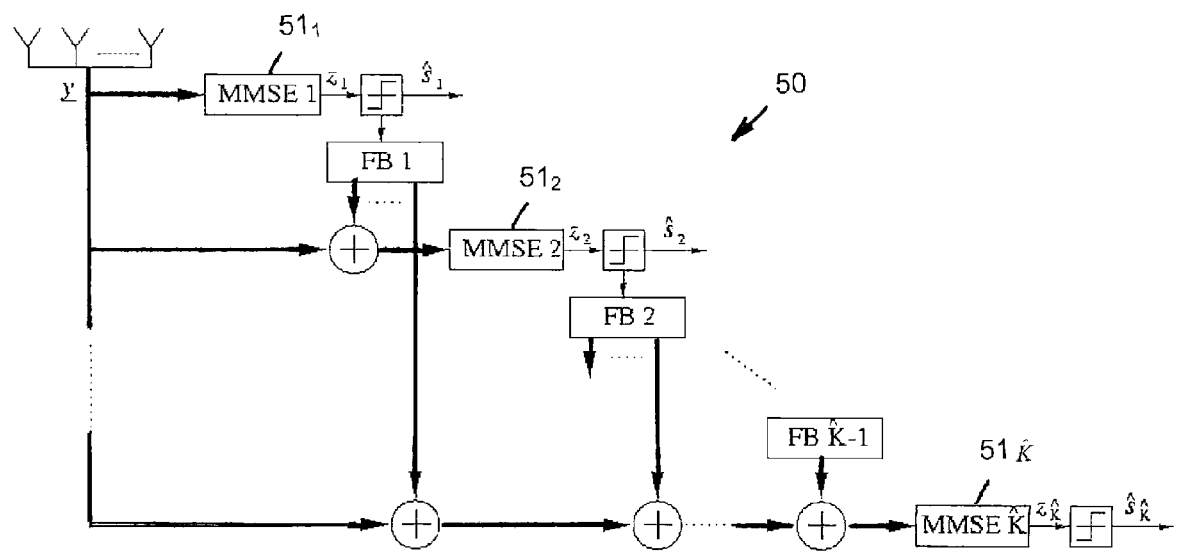
FIG. 5 is a simplified block diagram of an embodiment of the receiver of the present invention.

FIG. 5 is a simplified block diagram of an embodiment of the receiver 50 of the present invention. As shown, an input signal $\underline{y}$ is processed by the receiver utilizing a Minimum Mean Square Error-Decision Feedback Equalizer (MMSE-DFE) successive decoder 51₁-51_K. Bold lines in FIG. 5 denote vectors, and regular lines denote scalars. The MMSE feedforward filter and the feedback filter for the k-th stream (stage) are given by:

$$\underline{f}_k(\hat{n}) = \left(I_N + \frac{1}{N_0} G_{k+1}(\hat{n}) G_{k+1}^H(\hat{n})\right)^{-1} \underline{g}_k(\hat{n}) \quad (13)$$

and $$\underline{b}_k(\hat{n}) = -\underline{g}_k(\hat{n}), \quad (14)$$

respectively. The input to the k-th decoder is:

$$z_k = \underline{f}_k^H(\hat{n})\left(\underline{y} + \sum_{l=1}^{k-1} \underline{b}_l(\hat{n}) \hat{s}_l\right). \quad (15)$$

The k-th decoder produces an estimate of the k-th input stream $\hat{s}_k$.

EXAMPLE

Consider the example of a 4×2 MIMO system. From the theory of MIMO channels, we know that an optimum number of input streams that can be transmitted is less than or equal to min(M, N)=2. There are eight possible transmit antenna set partitions in this case: one with single input stream (K=1), the rest with two input streams (K=2). The partitions are:

A(1)={{1,2,3,4}}, A(2)={{1,2,3}, {4}}, A(3)={{1,2,4}, {3}}, A(4)={{1,3,4}, {2}},

A(5)={{2,3,4}, {1}}, A(6)={{1,2}, {3,4}}, A(7)={{1,3}, {2,4}} and A(8)={{1,4}, {2,3}}.

The prefilter weight matrices corresponding to these antenna set partitions are given below in order.

$$\{W(n), n = 1, 2, \ldots, 8\} = \quad (16)$$

$$\left\{ \sqrt{\frac{P_T}{4}} \begin{bmatrix} 1 \\ e^{j\hat{\theta}_2^1(1)} \\ e^{j\hat{\theta}_3^1(1)} \\ e^{j\hat{\theta}_4^1(1)} \end{bmatrix}, P' \begin{bmatrix} 1 \\ e^{j\hat{\theta}_2^1(2)} \\ e^{j\hat{\theta}_3^1(2)} \\ 0 \end{bmatrix}, P' \begin{bmatrix} 1 & 0 \\ e^{j\hat{\theta}_2^1(3)} & 0 \\ 0 & 1 \\ e^{j\hat{\theta}_4^1(3)} & 0 \end{bmatrix}, \right.$$

$$P' \begin{bmatrix} 1 & 0 \\ 0 & 1 \\ e^{j\hat{\theta}_1^1(4)} & 0 \\ e^{j\hat{\theta}_4^1(4)} & 0 \end{bmatrix}, P' \begin{bmatrix} 0 & 1 \\ 1 & 0 \\ e^{j\hat{\theta}_1^1(5)} & 0 \\ e^{j\hat{\theta}_1^1(5)} & 0 \end{bmatrix}, \sqrt{\frac{P_T}{4}} \begin{bmatrix} 1 & 0 \\ e^{j\hat{\theta}_2^1(6)} & 0 \\ 0 & 1 \\ 0 & e^{j\hat{\theta}_4^2(6)} \end{bmatrix},$$

$$\left. \sqrt{\frac{P_T}{4}} \begin{bmatrix} 1 & 0 \\ 0 & 1 \\ e^{j\hat{\theta}_1^1(7)} & 0 \\ 0 & e^{j\hat{\theta}_4^2(7)} \end{bmatrix}, \sqrt{\frac{P_T}{4}} \begin{bmatrix} 1 & 0 \\ 0 & 1 \\ 0 & e^{j\hat{\theta}_1^2(8)} \\ e^{j\hat{\theta}_4^1(8)} & 0 \end{bmatrix} \right\},$$

where $$P' = \begin{bmatrix} \sqrt{\frac{P_T}{6}} & 0 \\ 0 & \sqrt{\frac{P_T}{2}} \end{bmatrix}. \quad (17)$$

An integer with 3 bits can be used to signal the selected partition to the transmitter. The eight possible outcomes of this integer corresponding to the above partitions are $\{r_1, \hat{\theta}_2^1(1), \hat{\theta}_3^1(1), \hat{\theta}_4^1(1)\}$, $\{r_1, \hat{\theta}_2^1(2), \hat{\theta}_3^1(2), r_2\}$, $\{r_1, \hat{\theta}_2^1(3), r_2, \hat{\theta}_4^1(3)\}$, $\{r_1, r_2, \hat{\theta}_3^1(4), \hat{\theta}_4^1(4)\}$, $\{r_2, r_1, \hat{\theta}_3^1(5), \hat{\theta}_4^1(5)\}$, $\{r_1, \hat{\theta}_2^1(6), r_2, \hat{\theta}_4^2(6)\}$, $\{r_1, r_2, \hat{\theta}_3^1(7), \hat{\theta}_4^2(7)\}$ and $\{r_1, r_2, \hat{\theta}_3^1(8), \hat{\theta}_4^1(8)\}$, respectively.

The receiver feeds back the channel state information to the transmitter. In a preferred embodiment of the present invention, the feedback information comprises the partition selection (which can be signaled by means of an integer as described above) and the rates and angles of the selected partition.

When comparing the complexity of Multiple Stream Co-phasing (MSC) with S-PARC, it can be concluded that the complexities are of the same order. The transmitters for the two schemes require similar complexity, with the only additional requirement for MSC being phase rotation. The receivers for the two schemes are identical. The only difference in complexity between MSC and S-PARC is in how the feedback coefficients are computed. For S-PARC, the feedback coefficients are computed by computing the capacity for all possible subsets of the set of transmit antennas and then computing the individual capacity of each stream (stream capacities) for the chosen subset. For MSC, the feedback coefficients are computed by computing the capacity for all possible partitions of the set of transmit antennas and then computing the stream capacities for the chosen partition.

The number of subsets of the set of transmit antennas (except the null set) is $2^{M-1}$. It has been found that the number of antenna set partitions for 2×2, 3×3, and 4×4 MIMO systems are 2, 5, and 15, respectively. For example, the partitions for a 4×4 system (in addition to the partitions given in the previous section for a 4×2 system) are:

A(9)={{1,2}, {3}, {4}}, A(10)={{1,3}, {2}{4}}, A(11)={{1,4}, {2}, {3}},

A(12)={{2,3}, {1}, {4}}, A(13)={{2,4}, {1}, {3}},
  A(14)={{3,4}, {1}, {2}}, and
A(15)={{1}, {2}, {3}, {4}}.

For 2×2, 3×3, and 4×4 MIMO systems, the number of partitions (2, 5, and 15, respectively) is less than or equal to the number of subsets (3, 7, and 15, respectively). The two schemes thus require a similar number of capacity evaluations. An additional requirement for MSC is the computation of co-phasing angles for each partition. A closed-form expression, equation (11), is used for the computation of a single co-phasing angle. An iterative algorithm is used for the computation of multiple co-phasing angles. It has been found that two iterations of the serial iterative algorithm described above provides very good estimates. Thus, the complexities of MSC and S-PARC are of the same order.

In another embodiment of the present invention, referred to as selective-MSC (S-MSC), the transmit antennas are utilized selectively as in selective-PARC (S-PARC). In S-MSC, all possible (or desirable) subsets of the set of transmit antennas are considered for transmitting input streams. The subset that achieves the highest capacity is selected. The capacity for each subset $S \subseteq \{1, 2, \ldots, M\}$ (except the null set) is found by partitioning the set S into all possible (or desirable) partitions (as in MSC) and evaluating the capacity for the partitions. The capacity for the set S is the maximum capacity over all partitions. S-MSC is useful at low SNR, when it may be better to not waste transmit power on an antenna that has weak signal power (below or not much higher than noise level). The receiver performs the antenna selection for S-MSC by hypothesizing each (or each desirable) subset of transmit antennas and finding the best partition and the capacity for that subset. The subset that maximizes capacity is selected along with the partition. The receiver then signals this information to the transmitter.

In yet another embodiment, only certain (desirable) partitions are considered. For example, for a 4×4 MIMO system, one may consider the partitions A(1)={{1}, {2}, {3}, {4}} and A(2)={1, 2, 3, 4} only. The first partition corresponds to sending four independent input streams on four antennas, and the second partition corresponds to sending one input stream on all four antennas after co-phasing.

Other embodiments of the present invention include: (a) using alternative methods (metrics) for generating co-phasing angles, (b) quantizing rate and/or angle information for feedback, (c) using different power scaling of the streams based on the knowledge or an estimate of antenna gain disparity, and (d) using antenna correlation information.

It has been found that MSC greatly outperforms S-PARC under many practical conditions including low SNR, correlated receive antennas, systems in which there are fewer receive antennas than transmit antennas, and Ricean fading. This is because, unlike S-PARC, MSC uses all antennas to transmit an adaptive number of data streams with co-phasing, which achieves high SNR. For a 4×4 MIMO system with Ricean fading (8 dB line of sight component), MSC obtains a gain of 3.8 dB over S-PARC at the rate of 3 bits per symbol. For many MIMO channels of interest, MSC gets very close to the capacity of an optimum closed-loop MIMO scheme for the entire SNR range. This is achieved with similar complexity and feedback requirements as S-PARC (which are much less than those for optimum closed-loop MIMO).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of partitioning transmit antennas in a radio system, said method being performed in a receiver in a first node communicating with a transmitter in a second node in the radio system, wherein multiple independent data streams are transmitted from subsets of a plurality of transmit antennas, said method comprising the steps of:
   determining for each transmit antenna, a co-phasing angle that maximizes the received signal power, said step of determining a co-phasing angle for each transmit antenna being characterized by:
      computing a prefilter weight matrix for each transmit antenna subset;
      computing a prefilter channel as a product of the prefilter weight matrix and a channel impulse response matrix;
      computing a trace metric of a prefilter channel autocorrelation matrix;
      maximizing the trace metric to decouple the input streams; and
      determining the co-phasing angles independently for each data stream;
   determining a partitioning of the plurality of transmit antennas that provides the highest channel capacity among all possible partitionings, wherein the step of determining a partitioning of the plurality of transmit antennas includes determining the number of transmit antenna subsets, which transmit antennas are included in each subset, and the capacity of the data stream to be transmitted from each transmit antenna subset; and
   providing to the transmitter, information regarding the determined co-phasing angle for each transmit antenna, and information regarding the transmit antenna partitioning such that the transmitter can partition the plurality of transmit antennas into mutually exclusive subsets in accordance with the determined partitioning information.

2. The method according to claim 1, wherein the step of determining a partitioning of the plurality of transmit antennas includes:
   hypothesizing every possible partition of the set of transmit antennas into subsets;
   for each antenna partitioning, determining the co-phasing angles to be applied to each transmit antenna in each subset;
   for each transmit antenna partitioning, determining a total channel capacity; and
   selecting the transmit antenna partitioning that provides the highest channel capacity.

3. The method according to claim 2, wherein the step of hypothesizing every possible partition of the set of transmit antennas into subsets includes hypothesizing every transmit antenna subset that is supported by the transmitter.

4. The method according to claim 1, wherein the step of determining a partitioning of the plurality of transmit antennas into a plurality of subsets includes partitioning the plurality of transmit antennas into every possible antenna subset.

5. The method according to claim 1, wherein the step of calculating a relative phase rotation for each transmit antenna in each partitioned subset includes utilizing an iterative algorithm to find the relative phase rotation for each transmit antenna that maximizes received signal strength at the receiver for the subset.

6. A radio receiver in a first node for communicating with a transmitter in a second node, said transmitter having a plurality of transmit antennas, said receiver characterized in comprising:

means for determining for each transmit antenna, a co-phasing angle that maximizes the received signal power, said means for determining a co-phasing angle for each transmit antenna including:
  means for computing a prefilter weight matrix for each transmit antenna subset;
  means for computing a prefilter channel as a product of the prefilter weight matrix and a channel impulse response matrix;
  means for computing a trace metric of a prefilter channel autocorrelation matrix;
  means for maximizing the trace metric to decouple the input streams; and
  means for determining the co-phasing angles independently for each data stream;
means for determining a partitioning of the plurality of transmit that provides the highest channel capacity among all possible partitionings, wherein the means for determining the partitioning includes means for determining the number of transmit antenna subsets, which transmit antennas are included in each subset, and the capacity of the data stream to be transmitted from each transmit antenna subset;
means for selecting a subset having the highest stream capacity; and
means for sending to the transmitter, information regarding the determined co-phasing angle for each transmit antenna and the determined partitioning.

7. The radio receiver according to claim 6, wherein the means for determining a partitioning of the plurality of transmit antennas is further characterized by:
  means for determining a stream capacity for every possible transmit antenna subset;
  means for determining a total channel capacity for each transmit antenna partitioning; and
  means for selecting the transmit antenna partitioning that provides the highest channel capacity.

8. The radio receiver according to claim 7, whereby every possible transmit antenna subset implies every transmit antenna subset that is supported by the transmitter.

9. A radio transmitter in a second node for communicating with a receiver in a first node, said transmitter having a plurality of transmit antennas, said transmitter comprising:
  means for receiving from the receiver, information regarding a determined co-phasing angle for each transmit antenna and a partitioning of the plurality of transmit antennas into subsets determined by the receiver after determining the co-phasing angles, the determined partitioning providing the highest channel capacity among all possible partitionings;
  means for partitioning the plurality of transmit antennas into mutually exclusive subsets in accordance with the determined partitioning information;
  means for applying a relative phase rotation to each transmit antenna in each subset in accordance with the co-phasing angles received from the receiver; and
  means for transmitting an independent data stream from each partitioned subset of transmit antennas.

10. A method of partitioning transmit antennas in a radio system, said method being performed in a transmitter in a second node communicating with a receiver in a first node in the radio system, wherein multiple independent data streams are transmitted from subsets of a plurality of transmit antennas, said method comprising the steps of:
  receiving from the receiver, information regarding a determined a co-phasing angle for each transmit antenna and a partitioning of the plurality of transmit antennas into subsets determined by the receiver after determining the co-phasing angles, the determined partitioning providing the highest channel capacity among all possible partitionings;
  partitioning the plurality of transmit antennas into mutually exclusive subsets in accordance with the determined partitioning information;
  applying a relative phase rotation to each transmit antenna in each subset in accordance with the co-phasing angles received from the receiver; and
  transmitting an independent data stream from each partitioned subset of transmit antennas.

11. A radio system comprising:
  a receiver in a first node;
  a transmitter in a second node in communication with the first node; and
  a plurality of transmit antennas, said transmitter transmitting multiple independent data streams from subsets of the plurality of transmit antennas;
  wherein the receiver comprises:
    means for determining for each transmit antenna, a co-phasing angle that maximizes the received signal power, said means for determining a co-phasing angle for each transmit antenna including:
      means for computing a prefilter weight matrix for each transmit antenna subset;
      means for computing a prefilter channel as a product of the prefilter weight matrix and a channel impulse response matrix;
      means for computing a trace metric of a prefilter channel autocorrelation matrix;
      means for maximizing the trace metric to decouple the input streams; and
      means for determining the co-phasing angles independently for each data stream;
    means for determining a partitioning of the plurality of transmit that provides the highest channel capacity among all possible partitionings, wherein the means for determining the partitioning includes means for determining the number of transmit antenna subsets, which transmit antennas are included in each subset, and the capacity of the data stream to be transmitted from each transmit antenna subset;
    means for selecting a subset having the highest stream capacity; and
    means for sending to the transmitter information regarding the determined co-phasing angle for each transmit antenna and the determined partitioning.

12. The radio system of claim 11, wherein the transmitter comprises:
  means for receiving from the receiver, information regarding a determined co-phasing angle for each transmit antenna and a partitioning of the plurality of transmit antennas into subsets determined by the receiver after determining the co-phasing angles, the determined partitioning providing the highest channel capacity among all possible partitionings;
  means for partitioning the plurality of transmit antennas into mutually exclusive subsets in accordance with the determined partitioning information;
  means for applying a relative phase rotation to each transmit antenna in each subset in accordance with the co-phasing angles received from the receiver; and
  means for transmitting an independent data stream from each partitioned subset of transmit antennas.

* * * * *

UNITED STATES PATENT AND TRADEMARK OFFICE
CERTIFICATE OF CORRECTION

PATENT NO. : 7,558,330 B2
APPLICATION NO. : 11/275068
DATED : July 7, 2009
INVENTOR(S) : Hafeez It is certified that error appears in the above-identified patent and that said Letters Patent is hereby corrected as shown below:

In Column 8, Lines 37-38, delete " $\{r_1, r_2, \tilde{\theta}_3^i(8),$ " and insert -- $\{r_1, r_2, \dot{\theta}_3^i(8),$ --, therefor.

Signed and Sealed this

Twenty-sixth Day of January, 2010

David J. Kappos
*Director of the United States Patent and Trademark Office*